(12) United States Patent
Hipp

(10) Patent No.: US 6,895,400 B1
(45) Date of Patent: May 17, 2005

(54) DYNAMIC SYMBOLIC LINK RESOLUTION

(75) Inventor: Burton A. Hipp, Elk Grove, CA (US)

(73) Assignee: Veritas Operating Corporation, Mountain View, CA (US)

(*) Notice: Subject to any disclaimer, the term of this patent is extended or adjusted under 35 U.S.C. 154(b) by 900 days.

(21) Appl. No.: 09/680,560

(22) Filed: Oct. 5, 2000

Related U.S. Application Data

(60) Provisional application No. 60/157,727, filed on Oct. 5, 1999, provisional application No. 60/157,728, filed on Oct. 5, 1999, provisional application No. 60/157,833, filed on Oct. 5, 1999, provisional application No. 60/157,729, filed on Oct. 5, 1999, and provisional application No. 60/157,834, filed on Oct. 5, 1999.

(51) Int. Cl.[7] .............................................. G06F 17/30
(52) U.S. Cl. .......................................................... 707/1
(58) Field of Search .................................. 707/200–206, 707/1–10

(56) References Cited

U.S. PATENT DOCUMENTS

| | | | |
|---|---|---|---|
| 5,388,257 A | * 2/1995 | Bauer | 707/1 |
| 5,627,996 A | * 5/1997 | Bauer | 703/20 |
| 5,832,527 A | 11/1998 | Kawaguchi | 707/205 |
| 5,905,990 A | 5/1999 | Inglett | 707/200 |
| 6,006,236 A | 12/1999 | Young | 707/103 |
| 6,321,219 B1 | * 11/2001 | Gainer et al. | 707/3 |

\* cited by examiner

Primary Examiner—St. John Courtenay, III
(74) Attorney, Agent, or Firm—Lawrence J. Merkel; Meyertons, Hood, Kivlin, Kowert & Goetzel, P.C.

(57) ABSTRACT

To achieve the foregoing, and in accordance with the purpose of the present invention, a system or network is disclosed which provides for a dynamic symbolic link (DSL) and the resolution of that DSL. The invention provides a method and apparatus that renames a first pathname to a target pathname, determines a variable within the target pathname, defines the first pathname as a symbolic link and associates the symbolic link with a virtual pathname. The present invention further defines a specification associated with the virtual pathname including associating the variable with the virtual pathname. In associating the symbolic link with the virtual pathname, the present invention further define a declaration within the virtual pathname.

48 Claims, 5 Drawing Sheets

Flowchart of dynamic symbolic link resolution.

*Creation of a dynamic symbolic link.*

*Registration of a dynamic symbolic link specification.*

Resolution of a dynamic symbolic link.

*Flowchart of dynamic symbolic link resolution.*

DYNAMIC SYMBOLIC LINK RESOLUTION

REFERENCE TO RELATED APPLICATIONS

The present application claims priority to and incorporates the following applications by reference: DYNAMIC SYMBOLIC LINK RESOLUTION, Prov. No. 60/157,727, filed on Oct. 5, 1999; SNAPSHOT VIRTUAL TEMPLATING, Prov. No. 60/157,729, filed on Oct. 5, 1999; SNAPSHOT RESTORE OF APPLICATION CHAINS AND APPLICATIONS, Prov. No. 60/157,833, filed on Oct. 5, 1999; VIRTUAL RESOURCE-ID MAPPING, Prov. No. 60/157,729, filed on Oct. 5, 1999; and VIRTUAL PORT MULTIPLEXING, Prov. No. 60/157,834, filed on Oct. 5, 1999.

FIELD

The present invention relates generally to resource management in a computer network. More specifically, the present invention relates to dynamic symbolic link resolution to discrete storage locations throughout a computer network.

BACKGROUND

In prior art computer networks pointers or links are provided to indicate the location of a specific directory or file to allow a computer connected to the network to access or retrieve a specific file. Some prior art computational systems provide a mechanism for accessing a file pathname by alternate references. In this case, a particular file may have multiple pathnames that reference the file, with only one true path to the actual file or executable. These multiple references are commonly referred to as "shortcuts," aliases" or "symbolic links." Thus, prior art systems allow for a plurality of pathnames to access the same file. However, there is no function or mechanism for allowing a single pathname to access a plurality of different directories or files.

SUMMARY

To achieve the foregoing, and in accordance with the purpose of the present invention, a system or network is disclosed which provides for a dynamic symbolic link (DSL) and the resolution of that DSL. The invention provides a method and apparatus that renames a first pathname to a target pathname, determines a variable within the target pathname, defines the first pathname as a symbolic link and associates the symbolic link with a virtual pathname. The present invention further defines a specification associated with the virtual pathname including associating the variable with the virtual pathname. In associating the symbolic link with the virtual pathname, the present invention further define a declaration within the virtual pathname.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1A:
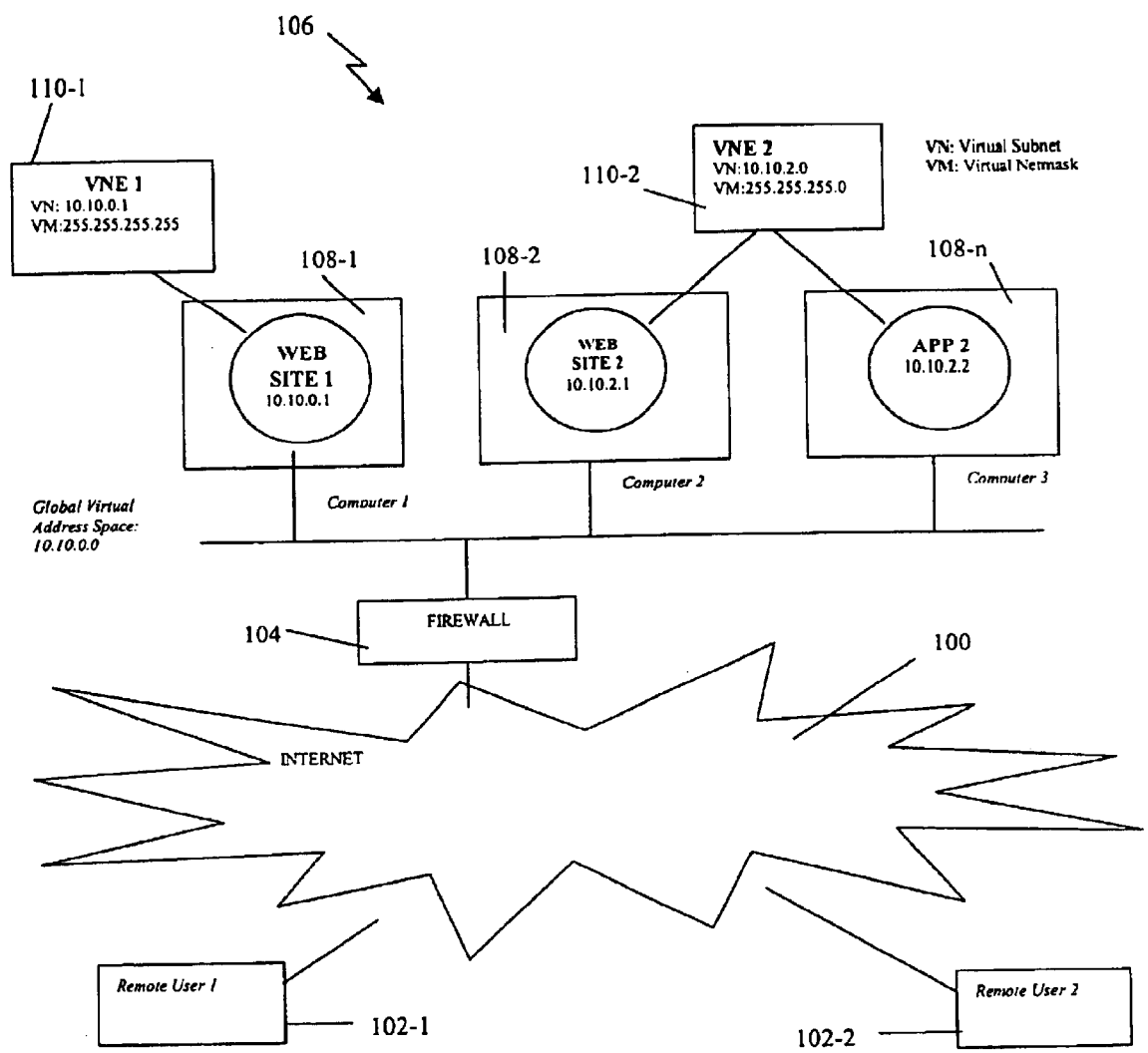
FIG. 1A is a high level block diagram illustrating the various components of a computer network used in connection with the present invention.

Among other aspects and innovations, the invention provides structure, system, method, method of operation, computer program product, and business model and method for providing dynamic symbolic links and resolution of those dynamic symbolic links. The inventive dynamic symbolic link and resolution provided by the present invention inverts the paradigm of the prior linking mechanisms. The present dynamic symbolic link and resolution enables a computer network, computer, processor, microprocessor, server and other computational systems to access a plurality of different directories, files or executables through a single dynamic symbolic link.

Where the prior art symbolic links allow a plurality of different links to access a single file, the present novel Dynamic Symbolic Link (DSL) and resolution of that DSL allows a computational system implementing the DSL and DSL resolution to access a plurality of different files, directories or executables from a single DSL.

By allowing access to a plurality of different directories or files from a single DSL, the present invention, in one embodiment, allows a plurality of instances of the same application to operate on a single computer without the applications interfering with one another. A first instance of an application will access, alter and/or store files, executables and data utilizing the DSL as resolved for the first instance. A second instance of an application will access, alter and/or store files, executables and data utilizing the DSL as resolved for the second instance, and so on. This isolates the files and data for each application instance, and thus prevents interference between instances of the application. Each instance of the application is capable of independently utilizing the computational resources without the need to reconfigure the application or the computational resources, thus the application is not limited to a specific computer.

In one embodiment, the present invention facilitates applications, such as Web servers and database applications, to be configured to operate in a computational network or system which includes a plurality of computers such that the applications are capable of being operated on a plurality of the computers within the system without reconfiguring the application or the computer. An application can be halted or frozen during operation on a first computer and reinitiated on a second computer without interrupting the application and without the need to reconfigure the second computer or application.

In one embodiment, isolating the instances of an application, and avoiding the necessity of limiting an instance to a specific computer network, allows the instance to be halted and reinitialized or reactivated on a second, different computer network. This frees up resources of the first computer network for other applications or instances.

When an application or process is operating, the application utilizes file pathnames and directory pathnames to access specifically defined or allocated portions of memory storage, for example, "/temp." However, if two or more instances of the same application attempt to operate from the same computer, both instances will attempt to access the same specifically allocated portion of the memory storage "/temp." This results in inconsistencies, illogical states and often fatal errors. The present invention allows for two or more instances of the same application to operate from the same computer without interference. The virtualizing of pathnames allows each instance of the application to be directed or allocated to different portions of memory, for example, "/temp_1" and "/temp_2." Thus, two or more separate instances of the same application can operate independently on the same computer without interference.

Additionally, by allowing a specific instance of an application to access specific, predefined pathnames associated with that instance, the application and all accompanying data, operating states and associated directories and files can be isolated. Once isolated, the application and all accompanying data, states, directories and files can be stored for later use, as well as moved or transferred to operate on a different computer or network without affecting the operation of the application or other instances of the application. One advantage provided by this ability to store and transfer or reallocate an instance of an application is the optimization of computer and network resources. For example, if a first instance of an application is not currently in use, the computer can halt or freeze the application and all its accompanying states and data. The computer can then store the halted application and all accompanying states and data freeing up the computer to activate a second different application or second instance of the same application.

One example of the ability to halt or freeze an application along with all its accompanying states and data is described in co-pending U.S. patent application Ser. No. 09/684,373, entitled "Snapshot Virtual Templating," filed on Oct. 5, 2000, incorporated herein by reference. One example of the ability to reinitialize an application along with all its accompanying states and data is described in co-pending U.S. patent application Ser. No. 09/680,847, entitled "Snapshot Restore Of Application Chains and Applications," filed on Oct. 5, 2000, incorporated herein by reference.

The present invention provides snapshot virtual templating by creating virtual application templates for the purpose of propagating a single application snapshot into multiple, distinct images. Snapshot virtual templates allow multiple application instances to use the same fixed resource identifier by making the resource identifier virtual, privatizing it, and dynamically mapping it to a unique system resource identifier. When a snapshot is cloned from a virtual template, the common or shared data is used exactly as is, whereas the non-sharable data is either copied-on-write, multiplexed, virtualized, or customized-on-duplication. The present invention greatly reduces the required administrative setup per application instance. Snapshot virtual templating works by noting access to modified resources, fixed system IDs/keys and unique process-related identifies and automatically inserting a level of abstraction between these resources and the application. The resources contained in a snapshot virtual template can be dynamically redirected at restore time. Access to memory and storage is managed in a copy-on-write fashion. System resource handles are managed in a virtualize-on-allocate fashion or by a multiplex-on-access mechanism. Process- unique resources are managed in a redirect-on-duplicate fashion. Rules may be defined through an application configurator that allows some degree of control over the creation of non-sharable data.

The present invention provides snapshot restoring by saving all process state, memory, and dependencies related to a software application to a snapshot image. Interprocess communication (IPC) mechanisms such as shared memory and semaphores must be preserved in the snapshot image as well. IPC mechanisms include any resource that is shared between two process or any communication mechanism or channel that allow two processes to communicate or interoperate is a form of IPC. Sockets, shared memory, semaphores and pipes are some examples of IPC mechanisms. Between snapshots, memory deltas are flushed to the snapshot image, so that only the modified-pages need be updated. Software modules that track usage of resources and their corresponding handles are included as part of the snapshot/restore framework of the present invention. At snapshot time, state is saved by querying the operating system kernel, the application snapshot/restore framework Or components, and the process management subsystem that allows applications to retrieve internal process-specific information not available through existing system calls. At restore time, the reverse sequence of steps for the snapshot procedure is followed and state is restored by making requests to the kernel, the application snapshot/restore framework, and the process management subsystem.

The present method and system of providing DSL and DSL resolution allows a single dynamic symbolic link to be evaluated to multiple distinct values, retargeting the request transparently based upon application or process-specific configurations. In one embodiment, a DSL will have a declaration that contains a tag which will be matched with a DSL specification at the time of evaluation or resolution.

FIG. 1A illustrates in high level block diagram form the overall structure of the present invention as used in connection with a global computer network 100 such as the Internet. Remote users 102-1 and 102-2 can connect through the computer network 100 to a private network of computers 106 protected by firewall 104. Computer network 106 is a network comprising computers 108-1, 108-2, through 108-n, where n is the total number of computers in network 106. Computers 150 are used to run various applications, as well as host web sites for access by remote users 102. The present invention is implemented on computer network 106 in the form of virtual environments 110-1 and 110-2. While only two virtual environments are illustrated, it is to be understood that any number of virtual environments may be utilized in connection with the present invention.

Figure 1B:
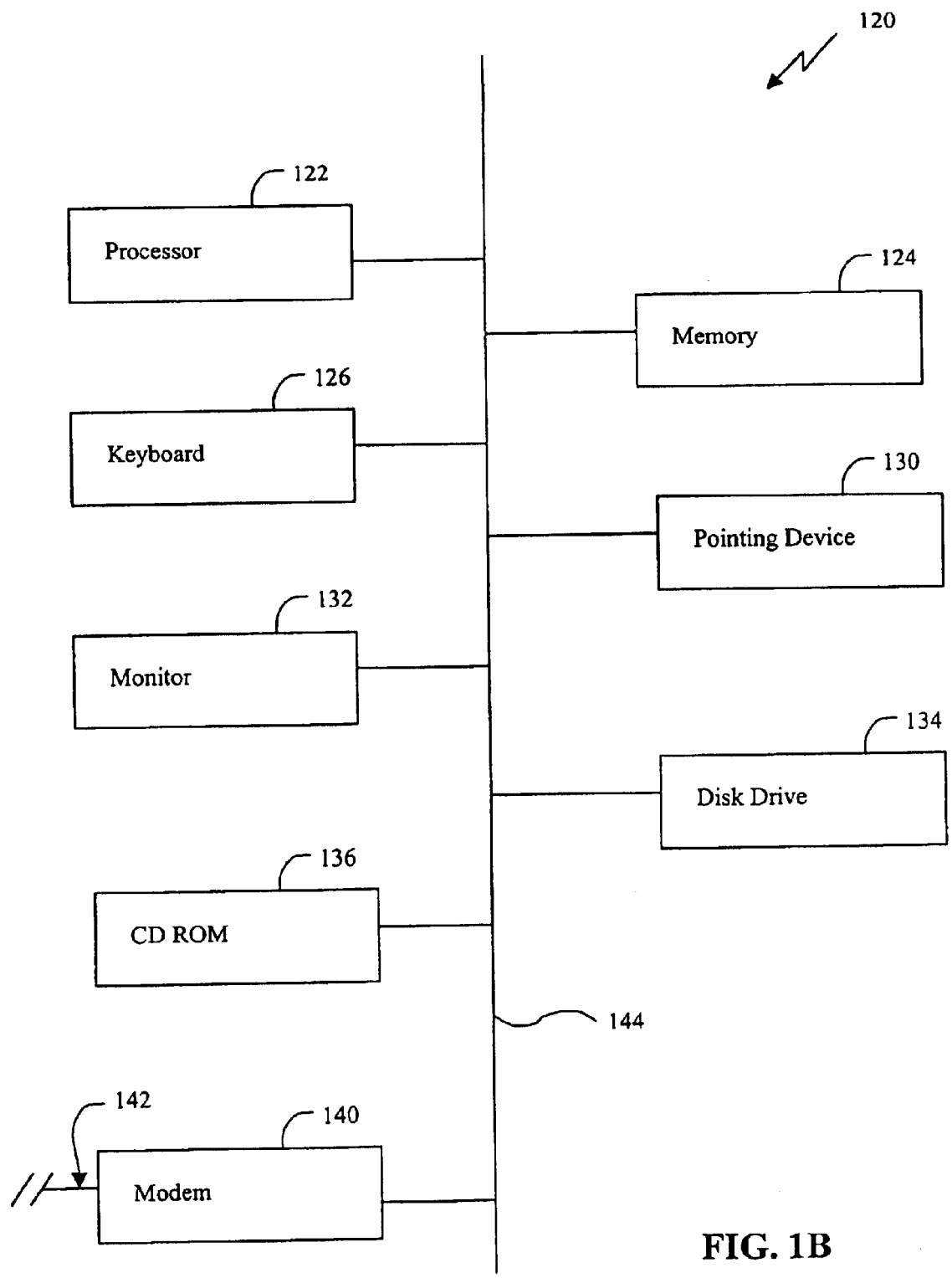
FIG. 1B is a high level block diagram depicting a computer used in connection with the present invention.

In one embodiment, the method and system of the present invention is implemented in a computer readable medium, such as a computer program 118 and executed on a computer 120 as illustrated in the high level block diagram of FIG. 1B. As shown, computer 120 incorporates a processor 122 utilizing, in one embodiment, a central processing unit (CPU) and supporting integrated circuitry. A memory 124 which is any type or combination of memory including fast semiconductor memory (e.g., RAM, NVRAM or ROM), slower magnetic memory (e.g., hard disk storage), optical memory and any conventional memory known in the art, to facilitate storage of the computer program 118 and the operating system software. In one embodiment, also included in computer 120 are interface devices including, but not limited to, keyboard 126, pointing device 130, and monitor 132, which allow a user to interact with computer 120. Mass storage devices such as disk drive 134 and CD ROM 136 may also be included in computer 120 to provide storage of information. Computer 120 may communicate with other computers and/or networks via modem 140 and telephone line 142 to allow for remote operation, or to utilize files stored at different locations. Other media may also be used in place of modem 140 and telephone line 142, such as a direct connection, high speed data line or a wireless connection, and the like. In one embodiment, the components described above may be operatively connected by a communications bus 144. In one embodiment, the components may be operatively connected by wireless communication.

In one embodiment, the DSL and DSL resolution system provides a DSL which defines a variable pathname to a requested directory or file. In one embodiment, the DSL is incorporated or configured in alternative attribute fields in a file structure of a file system 236 (see FIG. 4). If a DSL is incorporated within a file attribute, a utility or application programming interface call is provided to set this attribute and designate the link as a DSL. In one embodiment, the DSL allows the system to redirect the computer 120 to access one of a plurality of alternate directories or files as designated by the resolution of the DSL. One example of a DSL containing a DSL declaration is:

$$/home/\${ID\}/app/config \qquad (1)$$

In creating or associating the DSL, a file system 236 (see FIG. 4) entry is created which retargets the unique pathname of the file. In one embodiment, the retargeting is achieved by including at least one DSL declaration into the pathname to provide the DSL. In thins embodiment, when the DSL declaration is included within a DSL, the DSL declaration is configured as a predefined, recognizable alphanumeric character sequence including a single alphanumeric character or an alphanumeric string. In example 1 above, the DSL declaration is defined as "${ }." In one embodiment, the DSL declaration includes a "tag." The tag is a variable designation which is associated with one of a plurality of values. The tag is determined based on a DSL specification.

Figure 2:
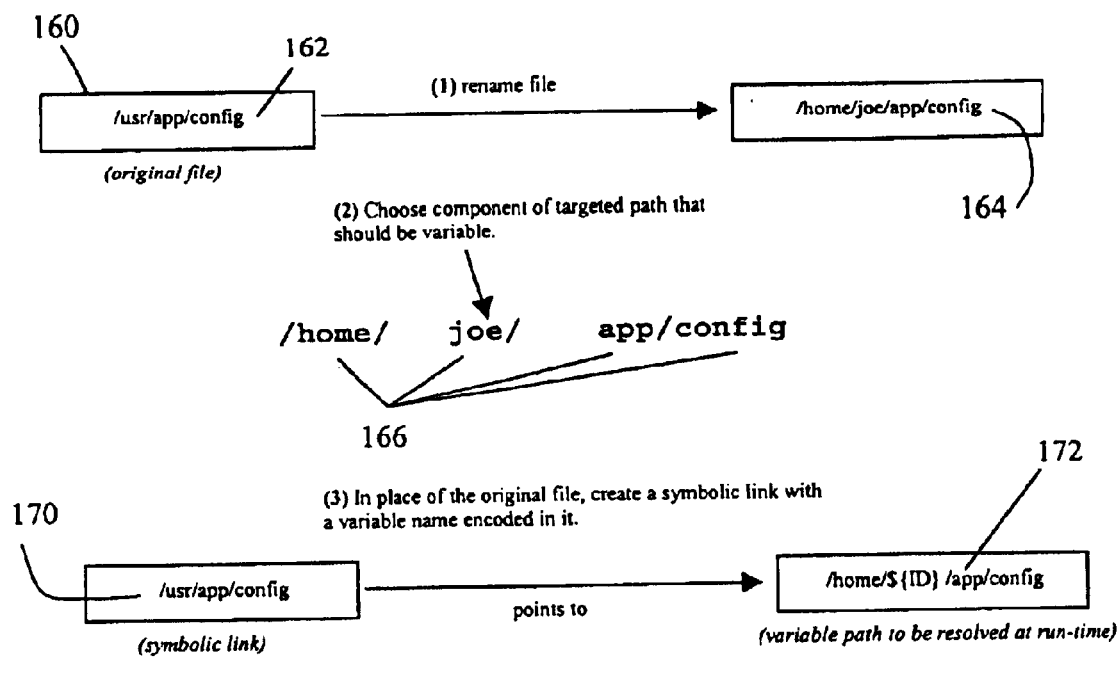
FIG. 2 depicts a simplified block diagram for creating a Dynamic Symbolic Link (DSL)

FIG. 2 shows a simplified block diagram of one implementation of one embodiment of the creation of a DSL. Target pathname 162 provides the destination location of an initial or original file attempting to be accessed by an application. Initially, the original pathname 162 is evaluated to determine if multiple versions of the file designated by the pathname 162 are needed. This determination is based on predefined parameters. In one embodiment, if a pathname is determined to be utilized by more than one application, or more than one instance of the same application may be operated, and the information associated with the file at the pathname contains unique information for each application or instance of an application, then the DSL is created. In creating the DSL the original pathname 162, for example "/usr/app/config," is renamed or retargeted with a target file pathname 164, for example "/home/joe/app/config." The target pathname provides the path to the final storage location of the file 160. The target pathname 164 is then evaluated to determine which components 166 of the target pathname 164 are variable, for example "joe," to uniquely identify and distinguish the target pathname for the current instance of the application. The variable components of the target pathname, in one embodiment, are considered the tags. Once the variable components are determined, the DSL is generated replacing the variable components with the DSL declaration, for example "${ID}," to be evaluated at run-time. The original file pathname 162 is then configured as a symbolic link 170. The symbolic link 170 is configured such that it points to the DSL 172, for example /home/$ {ID}/app/config, to be resolved at run-time.

In creating and resolving the variable symbolic link 172, a DSL specification is utilized. In one embodiment, the DSL specification is associated with an individual process. When associating the tag with the DSL specification, the specification can be added explicitly by calling into an application programming interface (API), or specified implicitly. As an example, the DSL specification can be specified implicitly through an application environment, such as an in-memory application state that can be examined by the operating system. It may also be specified implicitly through an associated configuration mechanism, such as a registry or database containing parameters, properties and characteristics relevant to the particular application. The associated configuration mechanism is implemented, for example, as part of the operating system or as another discrete software component. For example, an application harness (which establishes the appropriate runtime environment for an associated application prior to the launching of the application) may make the call which sets the DSL specification on behalf of the application and then invokes the application which inherits the DSL specification.

In one embodiment, the DSL specification includes at least one symbolic tag and at least one value associated with that symbolic tag. Referring back to example 1 above, the DSL declaration is "${ID}." The associated tag in this example is "ID." The DSL specification will include a reference to the symbolic tag "ID" as well as a value associated with the tag "ID".

Figure 3:
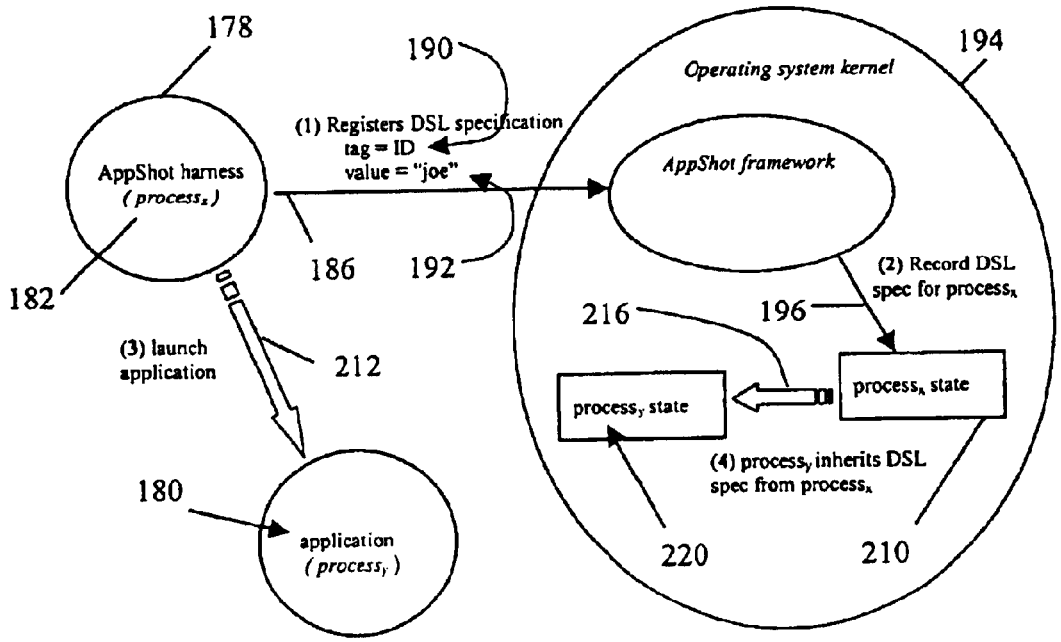
FIG. 3 shows, in accordance with another aspect of the present invention, a simplified block diagram of the registration of a DSL specification.

FIG. 3 shows a block diagram of the one implementation of one embodiment of the registration of the DSL specification associated with an application 180 having a process, 182. When an application is initiated an application harness (including process$_x$) 178 is signaled to launch. The application harness 178 registers (step 186) the DSL specification, including the tag 190 and associated value 192, with an operating system (OS) 194. The OS 194 records the DSL specification (step 196), and associates that DSL specification with the state of process, 210. The application 180 is then launched (step 212). In one embodiment, processes associated with the application 180 inherit the DSL specification of the process, of the application harness, such that when a process$_y$ 214 associated with application 180 is initiated, OS 194 assigns (step 216) the process$_y$ state 220 with the DSL specification from process$_x$ state 210. In one embodiment, processes associated with the application 180 have explicit DSL specifications and as such do not inherit the DSL specification.

In one embodiment, the DSL specification includes at least the symbolic tag and at least one associated value. For example, the DSL specification will provide a tag and value association similar to:

$$\begin{array}{ll} \underline{tag} & \underline{value} \\ ID & joe \end{array} \qquad (2)$$

As such, when the DSL declaration is identified, the DSL specification provides the associated value for the tag found within the DSL declaration. The value associated with the tag is substituted for the DSL declaration resulting in the target pathname. For example, the virtual pathname shown in example 1, using the DSL specification of example 2, will replace the DSL declaration "${ID}" with the DSL specification value "joe," resulting in an target pathname:

$$/home/joe/app/config \qquad (3)$$

Once associated or resolved, the target pathname, for example "/home/joe/app/config" as shown in example 3, indicates the location of the target file. Because the DSL declaration can be resolved into a plurality of different values, for example joe, kim, dave, sue, x, temp, etc., a plurality of different pathnames can be resolved, each leading to different files (i.e., /home/kim/app/config; /home/dave/app/config; /home/sue/app/config; etc.), wherein each file is associated with a specific instance of an application.

Figure 4:
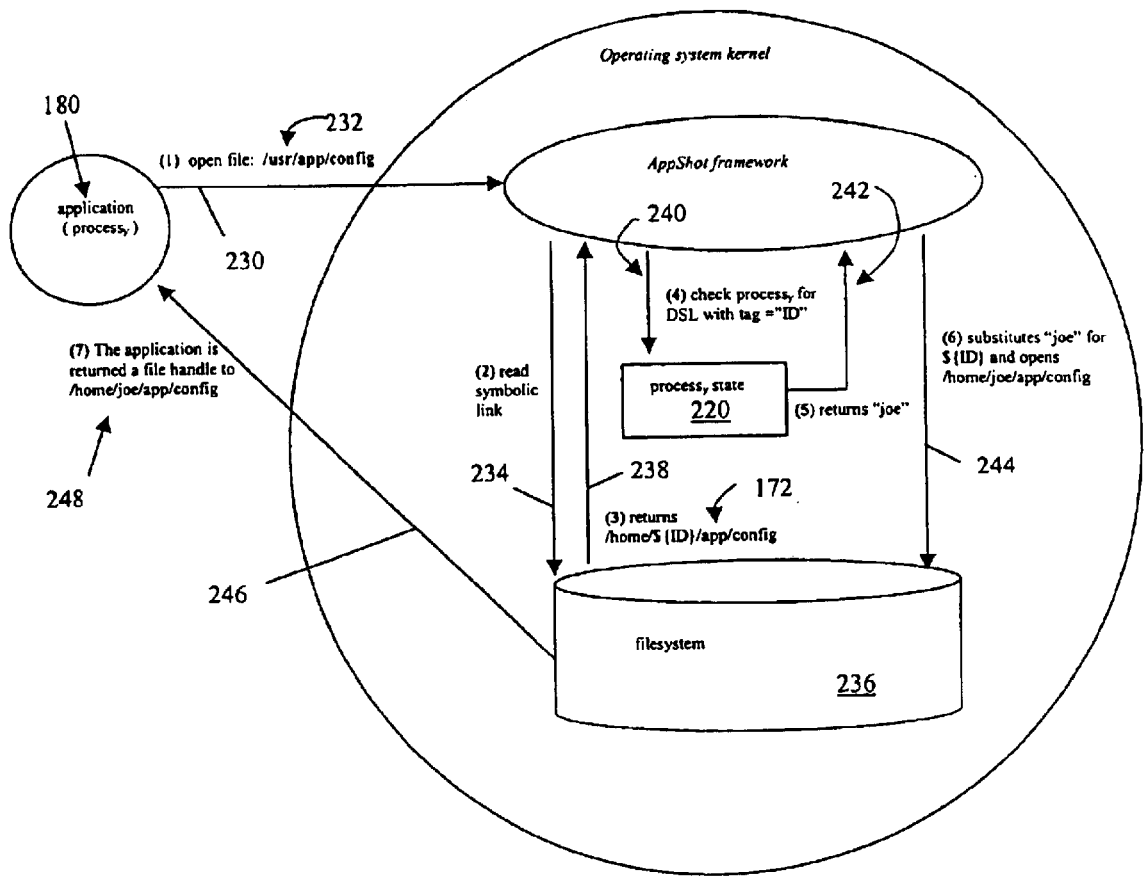
FIG. 4 shows, in accordance with another aspect of the present invention, a simplified block diagram of the resolution of the DSL.

FIG. 4 depicts a simplified block diagram of one implementation of one embodiment of the resolution of the DSL. An application 180 initiates a process, process$_y$, which prompts (step 230) the OS 194 to access or open a directory or file, for example "/usr/app/config" 232. The OS 194 initiates a read (step 234) of the file and recognizes the pathname to be a symbolic link 170 in a file system 236. In one embodiment, file system 236 is any type or combination of memory as described above. The file system 236 resolves the symbolic link and returns (step 238) a DSL 172 pointed to by the symbolic link 170. The OS 194 recognizes the instance of the DSL 172 by its DSL declaration and extracts the tag 190 from the DSL declaration. OS 194 then checks (step 240) process$_y$ for the DSL specification with a matching tag 190, for example "ID," associated with the process$_y$ state 220. Once the DSL specification is determined with the matching tag 190, the value 192, for example "joe," associated with the specific tag is returned (step 242). Once the value 192 is returned, the value 192 is substituted (step 244) into the DSL 172 resulting in the target pathname 164. The target pathname 164 is forwarded to the file system 236. The file system 236 will then return (step 246) a file handle 248, for example "/home/joe/app/config," to the application 180. In one embodiment, the file handle 248 is specifically associated with a single specific instance of an application, thus isolating the information from other applications.

Still referring to FIG. 4, in one embodiment, OS 194 includes an application snapshot (AppShot) framework. AppShot framework provides routing for pathnames during the resolution of DSLs. In one embodiment, the AppShot framework is a software layer that resides between the application that can intercept API calls and track process state associated with an application. In one embodiment, requests for system resources or changes to process state are routed internally and the AppShot framework tracks these events in anticipation of a snapshot.

In one embodiment, the application 180 initiating the DSL is unaware of the resolution of the DSL. The application 180 does not need to be modified to take advantage of the present DSL and DSL resolution. In one embodiment, a DSL specification is applied per process allowing a plurality of separate processes to obtain access to separate and distinct files which are referenced through a single pathname. Further, a process may have multiple DSL specifications. This allows a DSL specification to be created based on an intended use or functional use. For example, a first DSL specification may be used to redirect an application to the application's correct configuration file, while a second DSL specification may be used to redirect the application to the application's appropriate temporary file space area of memory.

In one embodiment, the method and apparatus allows the value associated with a tag to be designated or set as a default. When resolving the DSL, the OS 194 will search for the DSL specification with the matching tag 190. If the tag 190 is not found, the OS 194 will determine if a default value, for example "default," has been specified for the tag 190. If a default value has been set, then the OS 194 substitutes 244 the default value for the DSL declaration and accesses the file, for example, "/home/default/app/config," in file system 236. The default value is the value that is used in the absence of an explicit value. In one embodiment, if a dynamic symbolic link is encountered while referencing a file, and no DSL specification with a matching tag has been set for that process, the default value may be utilized to resolve the pathname. For example, the DSL specification will provide a tag with a default value assigned similar to:

$$\frac{tag}{ID} \quad \frac{value}{default}. \qquad (4)$$

A predefined alphanumeric character or string, such as ":=" followed by one or more alphanumeric characters, such as "default," defining the default value, may be utilized to designate a default value if no other value is defined. In this example, the default is designated as ":=default" with the value being equal to "default." In one embodiment, the default is derived from a character string contained within the DSL declaration. For example, if a DSL declaration is of the form "\$ {ID:=nobody}." Then "ID" is the tag portion of the DSL declaration, and "nobody" is defined as the default value for this declaration. If no match is found in resolving the tag "ID" (as described above), the default value "nobody" is used from the DSL declaration. The default is defined when the DSL declaration is created by adding a predefined alphanumeric character or string within the DSL declaration, for example ":=." The predefined alphanumeric string is then followed by one or more alphanumeric characters defining the default value, such as "nobody."

In one embodiment, if DSL declaration is not explicitly defined and a default value has not been set, the tag is utilized as the default value. For example, if a DSL declaration is of the form "\${ID}," then "ID" is the tag portion of the DSL declaration, and "ID" is utilized as the value, resulting in a resolved path name such as "/home/ID/app/config." In one embodiment, if the DSL declaration is not explicitly defined and a default value has not been set, the DSL declaration, "\$ {ID}," is literally utilized as the default value for the declaration, resulting in a path name such as "/home/\${ID}/app/config," to access the file in the file system 236.

In one embodiment, the DSL generation and resolution of the present invention allows for a DSL to point to another DSL for further resolution. Thus, when OS 194 resolves a first DSL resulting in a first target pathname, the first target pathname points to a second DSL which will again be resolved by the OS 194 to a second target pathname or another DSL.

In one embodiment, a DSL may include a plurality of DSL declarations. Thus, upon resolution, the OS 194 resolves each of the DSL declarations the plurality of resolutions. For example, a DSL having a plurality of DSL declarations may be "/home/\${ID}/app/\${temp}." In one embodiment, the OS 194 would resolve one of the declarations, for example "\${ID}," then resolve the other, "\${temp}."

Figure 5:
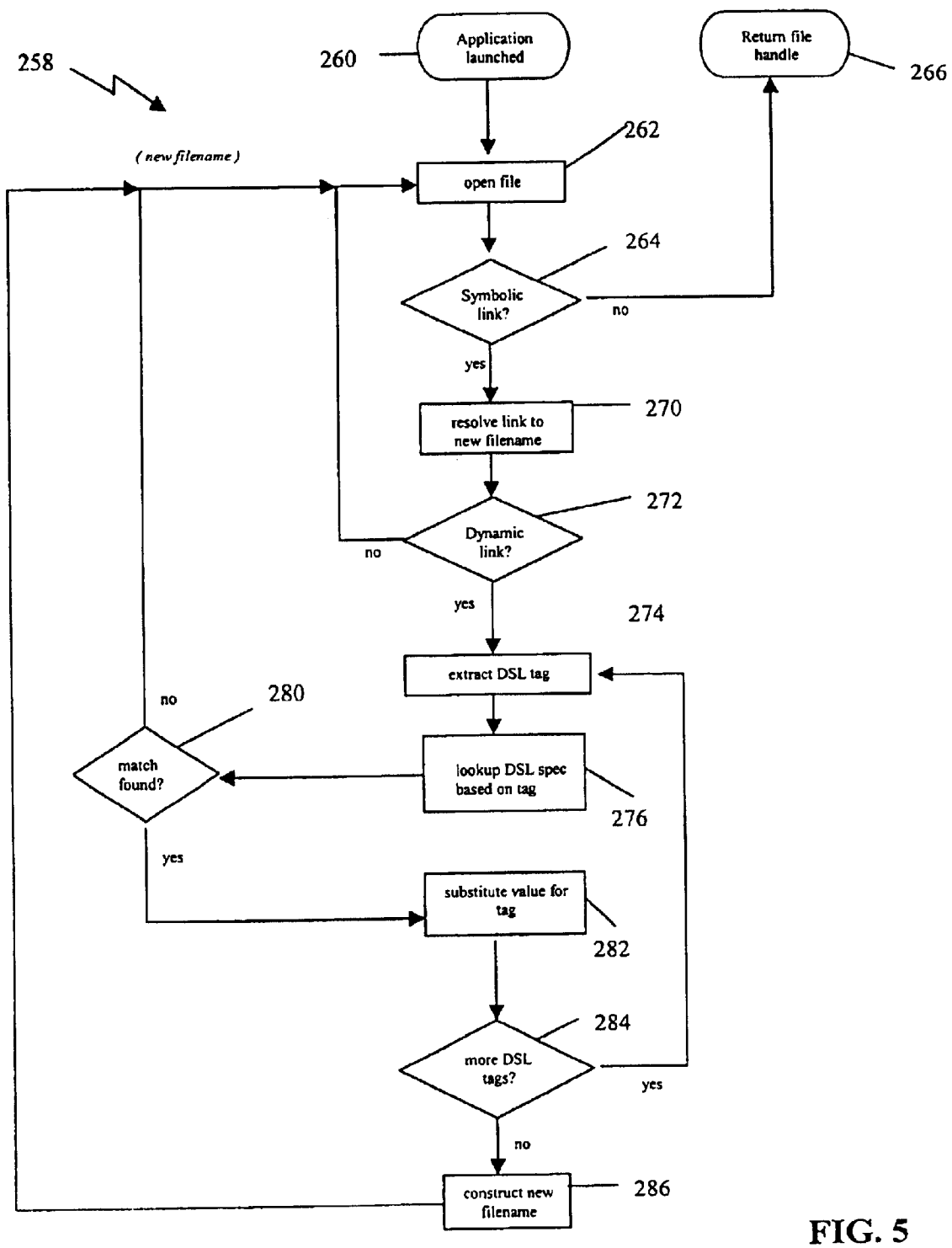
FIG. 5 shows, in accordance with another aspect of the present invention, a simplified flowchart of the resolution of a DSL.

FIG. 5 depicts a flow diagram of an implementation of an embodiment of the resolution of a DSL according to method 258. In step 260, the application 180 or process 182 is initiated. In step 262, the application 180 or process 182 requests to open a file 232. In step 264, the pathname is analyzed to determine if the pathname is a symbolic link 170. If not, control transitions to step 266 where the requested file handle is returned. If, in step 264, the pathname is a symbolic link 170, control transitions to step 270, where the symbolic link 270 is resolved to a new pathname. In step 272, the new filename is analyzed to determine if it is a DSL. If not, control returns to step 262 where an attempt is made to open the file based on the new pathname. If, in step 272, the new pathname is a DSL, control transitions to step 274, where the tag 190 is extracted from the DSL declaration. In step 276, the DSL specification is determined, in one embodiment through a look-up table, based on the extracted tag 190. In step 280 it is determined if a match for the tag 190 was found. If not, the method returns to step 262 where the file based on the DSL filename is attempted to be opened. Alternatively, if the DSL specification is found in step 280, the method 158 transition to step 282 where the value 192 associated with the tag 190 is determined and substituted into the DSL for the DSL declaration. Control continues to step 284 where the DSL is further analyzed to determine if additional DSL declarations exist within the DSL. If there are additional DSL declarations or DSL tags, control transitions back to step 274 to extract the DSL tag 190. If, in step 284, there are no further DSL declarations or tags, control transitions to step 286 where the target pathname 246 is constructed by substituting the value associated with each tag into the pathname in place of the corresponding DSL declaration. Control then returns to step 262 where an attempt is made to open the target file 164.

As taught by the foregoing description and examples, a dynamic symbolic link and dynamic symbolic link resolution method and system are provided by the present invention. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

Having disclosed exemplary embodiments and the best mode, modifications and variations may be made to the disclosed embodiments while remaining within the scope of the present invention as defined by the following claims.

What is claimed is:

1. A method, comprising:
   receiving a first pathname;
   determining if the first pathname is a dynamic symbolic link (DSL); and
   if the first pathname is a DSL:
      extracting at least one tag from the first pathname;
      determining at least one value corresponding to the tag; and
      substituting the first value into the first pathname in place of the tag, producing a first target pathname.

2. The method as recited in claim 1 further comprising accessing a file designated by the first target pathname.

3. The method as recited in claim 1, wherein the at least one tag comprises at least one DSL declaration.

4. The method as recited in claim 1, wherein the at least one tag comprises at least one predefined alphanumeric character sequence.

5. The method as recited in claim 1 further comprising:
   receiving a second pathname; and
   resolving the second pathname as a symbolic link to the first pathname prior to determining if the first pathname is the DSL.

6. The method as recited in claim 1, further comprising returning a first file handle to the first target pathname.

7. The method as recited in claim 1, wherein the first pathname is received in response to a request from a first application to access a first file, and wherein the method further comprises:
   receiving the first pathname in response to a request from a second application attempting to access the first file; and
   producing a second target pathname corresponding to the first pathname for the second application, the second target pathname different from the first target pathname.

8. The method as recited in claim 7, wherein:
   the first application is a first instance of the first application; and
   the second application is a second instance of the first application.

9. The method as recited in claim 1 further comprising registering the DSL prior to receiving the first pathname, wherein the registering includes:
   registering a DSL specification; and
   recording the DSL specification.

10. The method as recited in claim 9 further comprising receiving the DSL specification from a first process prior to registering the DSL specification.

11. The method as recited in claim 10 further comprising the first application inheriting the DSL specification of the first process.

12. The method as recited in claim 1 further comprising generating the DSL prior to the step of receiving the first pathname, wherein the generating includes:
   obtaining a second pathname;
   renaming the second pathname as the first target pathname;
   determining at least one variable in the first target pathname;
   generating the first pathname from the at least one variable and the first target pathname;
   creating a symbolic link from the second pathname pointing to the DSL.

13. The method as recited in claim 12 wherein generating the first pathname comprises:
   defining a DSL declaration using the variable; and
   substituting the variable in the first target pathname with the DSL declaration.

14. The method as recited in claim 1 further comprising:
   determining a default value if the first value can not be determined; and
   substituting the default value into the first pathname in place of the tag, producing the first target pathname.

15. The method as recited in claim 1, wherein:
   determining if the first pathname is a DSL includes determining if the pathname includes at least one declaration; and
   determining the at least one value includes utilizing the tag as the value.

16. The method as recited in claim 1, wherein:
   determining if the first pathname is a DSL includes determining if the pathname includes at least one declaration; and
   determining the at least one value includes utilizing the declaration as the first value.

17. A computer readable medium storing a plurality of instructions executable to perform a method comprising:
   receiving a first pathname;
   determining if the first pathname is a dynamic symbolic link (DSL); and if the first pathname is a DSL:
  extracting at least one tag from the first pathname;
  determining at least one value corresponding to the tag; and
  substituting the first value into the first pathname in place of the tag, producing a first target pathname.

18. The computer readable medium as recited in claim 17 wherein the method further comprises accessing a file designated by the first target pathname.

19. The computer readable medium as recited in claim 17, wherein the at least one tag comprises at least one DSL declaration.

20. The computer readable medium as recited in claim 17, wherein the at least one tag comprises at least one predefined alphanumeric character sequence.

21. The computer readable medium as recited in claim 17 wherein the method further comprises:
  receiving a second pathname; and
  resolving the second pathname as a symbolic link to the first pathname prior to determining if the first pathname is the DSL.

22. The computer readable medium as recited in claim 17 wherein the method further comprises returning a first file handle to the first target pathname.

23. The computer readable medium as recited in claim 17, wherein the first pathname is received in response to a request from a first application to access a first file, and wherein the method further comprises:
  receiving the first pathname in response to a request from a second application attempting to access the first file; and
  producing a second target pathname corresponding to the first pathname for the second application, the second target pathname different from the first target pathname.

24. The computer readable medium as recited in claim 23, wherein:
  the first application is a first instance of the first application; and
  the second application is a second instance of the first application.

25. The computer readable medium as recited in claim 17 wherein the method further comprises registering the DSL prior to receiving the first pathname, wherein the registering includes:
  registering a DSL specification; and
  recording the DSL specification.

26. The computer readable medium as recited in claim 25 wherein the method further comprises receiving the DSL specification from a first process prior to registering the DSL specification.

27. The computer readable medium as recited in claim 26 wherein the method further comprises the first application inheriting the DSL specification of the first process.

28. The computer readable medium as recited in claim 17 wherein the method further comprises generating the DSL prior to the step of receiving the first pathname, wherein the generating includes:
  obtaining a second pathname;
  renaming the second pathname as the first target pathname;
  determining at least one variable in the first target pathname;
  generating the first pathname from the at least one variable and the first target pathname;
  creating a symbolic link from the second pathname pointing to the DSL.

29. The computer readable medium as recited in claim 28 wherein generating the first pathname comprises:
  defining a DSL declaration using the variable; and
  substituting the variable in the first target pathname with the DSL declaration.

30. The computer readable medium as recited in claim 17 wherein the method further comprises:
  determining a default value if the first value can not be determined; and
  substituting the default value into the first pathname in place of the tag, producing the first target pathname.

31. The computer readable medium as recited in claim 17, wherein:
  determining if the first pathname is a DSL includes determining if the pathname includes at least one declaration; and
  determining the at least one value includes utilizing the tag as the value.

32. The computer readable medium as recited in claim 17, wherein:
  determining if the first pathname is a DSL includes determining if the pathname includes at least one declaration; and
  determining the at least one value includes utilizing the declaration as the first value.

33. A computer system comprising:
  a computer readable medium storing a plurality of instructions; and
  a processor coupled to receive the plurality of instructions and configured to execute the plurality of instructions;
  wherein the plurality of instructions, when executed, implement a method comprising:
  receiving a first pathname;
  determining if the first pathname is a dynamic symbolic link (DSL); and
  if the first pathname is a DSL:
    extracting at least one tag from the first pathname;
    determining at least one value corresponding to the tag; and
    substituting the first value into the first pathname in place of the tag, producing a first target pathname.

34. The computer system as recited in claim 33 wherein the method further comprises accessing a file designated by the first target pathname.

35. The computer system as recited in claim 33, wherein the at least one tag comprises at least one DSL declaration.

36. The computer system as recited in claim 33, wherein the at least one tag comprises at least one predefined alphanumeric character sequence.

37. The computer system as recited in claim 33 wherein the method further comprises:
  receiving a second pathname; and
  resolving the second pathname as a symbolic link to the first pathname prior to determining if the first pathname is the DSL.

38. The computer system as recited in claim 33 wherein the method further comprises returning a first file handle to the first target pathname.

39. The computer system as recited in claim 33, wherein the first pathname is received in response to a request from a first application to access a first file, and wherein the method further comprises:

receiving the first pathname in response to a request from a second application attempting to access the first file; and producing a second target pathname corresponding to the first pathname for the second application, the second target pathname different from the first target pathname.

40. The computer system as recited in claim 39, wherein:

the first application is a first instance of the first application; and the second application is a second instance of the first application.

41. The computer system as recited in claim 33 wherein the method further comprises registering the DSL prior to receiving the first pathname, wherein the registering includes:

registering a DSL specification; and recording the DSL specification.

42. The computer system as recited in claim 41 wherein the method further comprises receiving the DSL specification from a first process prior to registering the DSL specification.

43. The computer system as recited in claim 42 wherein the method further comprises the first application inheriting the DSL specification of the first process.

44. The computer system as recited in claim 33 wherein the method further comprises generating the DSL prior to the step of receiving the first pathname, wherein the generating includes:

obtaining a second pathname;

renaming the second pathname as the first target pathname;

determining at least one variable in the first target pathname;

generating the first pathname from the at least one variable and the first target pathname;

creating a symbolic link from the second pathname pointing to the DSL.

45. The computer system as recited in claim 44 wherein generating the first pathname comprises:

defining a DSL declaration using the variable; and substituting the variable in the first target pathname with the DSL declaration.

46. The computer system as recited in claim 33 wherein the method further comprises:

determining a default value if the first value can not be determined; and substituting the default value into the first pathname in place of the tag, producing the first target pathname.

47. The computer system as recited in claim 33, wherein:

determining if the first pathname is a DSL includes determining if the pathname includes at least one declaration; and determining the at least one value includes utilizing the tag as the value.

48. The computer system as recited in claim 33, wherein:

determining if the first pathname is a DSL includes determining if the pathname includes at least one declaration; and determining the at least one value includes utilizing the declaration as the first value.

* * * * *

UNITED STATES PATENT AND TRADEMARK OFFICE
CERTIFICATE OF CORRECTION

PATENT NO. : 6,895,400 B1
DATED : May 17, 2005
INVENTOR(S) : Burton A. Hipp

It is certified that error appears in the above-identified patent and that said Letters Patent is hereby corrected as shown below:

Column 1,
Line 7, please delete "60/157,727" and insert -- 60/157,728 -- in place thereof.
Line 13, please delete "60/157,729" and insert -- 60/157,727 -- in place thereof.

Signed and Sealed this

Twenty-third Day of August, 2005

JON W. DUDAS
*Director of the United States Patent and Trademark Office*